(12) United States Patent
Choi (10) Patent No.: US 7,562,542 B2
(45) Date of Patent: Jul. 21, 2009

(54) DRUM TYPE WASHER

(75) Inventor: Seung Bong Choi, Changwon-si (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 11/008,141

(22) Filed: Dec. 10, 2004

(65) Prior Publication Data

US 2005/0126230 A1 Jun. 16, 2005

(30) Foreign Application Priority Data

Dec. 10, 2003 (KR) .................. 10-2003-0089304

(51) Int. Cl.
*D06F 37/30* (2006.01)
(52) U.S. Cl. .................. 68/12.16; 68/140; 68/12.24
(58) Field of Classification Search .................. 68/12.16
See application file for complete search history.

(56) References Cited

U.S. PATENT DOCUMENTS

| 3,483,458 A | * | 12/1969 | Kirk ..................... 318/400.37 |
| 4,843,268 A | * | 6/1989 | Hovorka ..................... 310/181 |
| 5,148,069 A | * | 9/1992 | Nonaka et al. ............. 310/68 R |
| 6,474,114 B1 | * | 11/2002 | Ito et al. ..................... 68/140 |
| 7,111,478 B2 | * | 9/2006 | Fukui et al. ................ 68/12.24 |
| 2003/0172688 A1 | * | 9/2003 | Fukui et al. ................ 68/12.02 |
| 2004/0068857 A1 | * | 4/2004 | Park et al. ..................... 29/596 |

FOREIGN PATENT DOCUMENTS

| CN | 1293277 A | | 5/2001 |
| EP | 1028516 | * | 8/2000 |
| EP | 1028516 A2 | | 8/2000 |
| EP | 1428924 A1 | * | 9/2003 |
| EP | 1428924 | * | 6/2004 |
| JP | 2005-169126 A | * | 6/2005 |
| KR | 1999-32904 A | * | 5/1999 |

\* cited by examiner

*Primary Examiner*—Michael Barr
*Assistant Examiner*—Jason P Riggleman
(74) *Attorney, Agent, or Firm*—McKenna Long & Aldridge LLP (57) ABSTRACT

A drum opening is configured to be correctly aligned with a tub opening without physical contact with a drum or motor by using a position detection sensor. The drum type washer includes a tub and brackets on the tub to support bearings. A motor includes a rotor, which includes a rotor frame made of a steel plate, a multitude of magnets attached to an inner circumference of the rotor frame, and a position decision magnet coupled to one side of the rotor frame. The stator includes a sensing unit. The sensing unit has a speed detection sensor to detect a plurality of magnets and a position detection sensor to detect the position decision magnet. A washing shaft is coupled to a front, center portion of the drum to be connected to the motor. An assist shaft is coupled to a rear, center portion of the drum.

19 Claims, 12 Drawing Sheets

DRUM TYPE WASHER

This application claims the benefit of Korean Application No. 10-2003-0089304 filed on Dec. 10, 2003, which is hereby incorporated by reference.

BACKGROUND OF THE INVENTION

1. Field of the Invention

The present invention relates to a drum type washer, and more particularly, to a top-loading drum type washer having a door provided to its topside, in which a position detection Hall sensor always aligns a drum opening to coincide with the door on stopping an operation of the washer.

2. Discussion of the Related Art

Generally, a washer employs a motor as a main motive power source, and executes washing, rinsing, and dewatering cycles to remove filth from a laundry using reaction of a detergent and water. A general washer consists of a motor as a power device, a mechanical unit transferring energy to a laundry, a control unit controlling a washing course, a water supply unit for supplying water and a drain unit for draining water.

Washers are generally classified into a drum (cylinder) type, an agitator type, and a pulsator type.

The agitator type washer performs washing in a manner of turning an agitator projected upward from a center of a tub in alternate directions. The pulsator type washer performs washing in a manner of rotating a disc type pulsator to generate a water current for washing. And, the drum type washer performs washing in a manner of rotating a drum receiving water and laundry therein at a low rotational speed centering on a horizontal axis. In doing so, the laundry is lifted up to fall so as to be washed by the corresponding potential and kinetic energy. Specifically, the drum type washer has many advantages in causing almost no damage to the laundry and using a less amount of water and the demand for the drum type washer is rising.

In the drum type washer, an opening for a laundry input/output or a door is provided to a front part of a washer cabinet. In such a front-loading drum type washer, a drum opening, a tub opening, and a door is fixed to or aligned with a horizontal axis. Hence, the front-loading drum type washer needs no means for adjusting a position of the drum.

Yet, since the door is provided to a front side of the cabinet, a user has to bend herself/himself forward to input or withdraw a laundry via the door. Hence, the user needs a sufficient space for the job of inputting/withdrawing the laundry. Thus, the front-loading drum type washer needs a supplementary space for user's motion as well as its installation space.

To overcome such a disadvantage, a top-loading washer has been proposed. In case of employing a tip-loading system, a user needs not to excessively bend herself/himself forward to input or withdraw a laundry via a door. Hence, the supplementary space is unnecessary for the top-loading washer.

Figure 1:
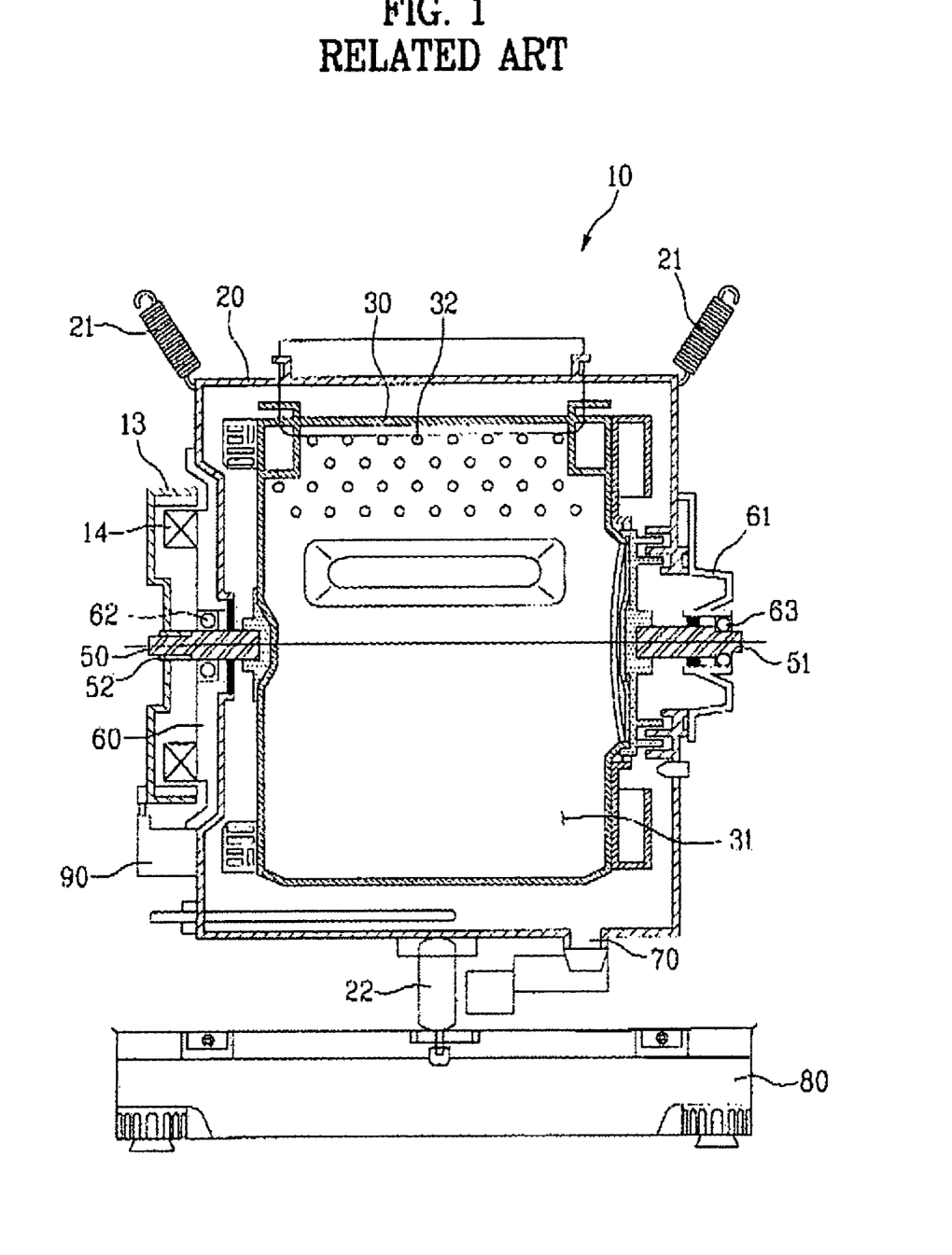
FIG. 1 is a cross-sectional diagram of a top-loading drum type washer according to a related art.

FIG. 1 is a cross-sectional diagram of a top-loading drum type washer according to a related art.

Referring to FIG. 1, a top-loading drum type washer 10 consists of a cylindrical drum 30 provided with a washing chamber 31 for receiving a laundry therein, a tub 20 holding the drum 30 therein to store water therein, and at least one spring 21 having one end an upper side of the tub 20 and the other end fixed to a cabinet (not shown in the drawing) of the washer. Hence, the tub 20 is suspended by the spring.

A multitude of perforated holes 32 are provided to a circumference of the drum 30 to enable the water stored in the tub 20 to communicate via the perforated holes 32.

The top-loading drum type washer 10 consists of a washing shaft 50 provided to front centers of the tub 20 and the drum 30 to rotate the drum 30 and an assist shaft 51 provided to rear centers of the tub 20 and the drum 30 to assist a rotation of the drum 30.

The top-loading drum type washer 10 consists of a bearing 62 enabling a smooth rotation of the washing shaft 50, a bearing 63 enabling a smooth rotation of the assist shaft 51, and brackets 60, 61 fixed to front and rear sides of the tub 20 to receive and support the bearings 62 and 63, respectively.

The top-loading drum type washer 10 consists of a bushing 52 serration-coupled to an outer circumference of the washing shaft 50 to rotate together and a motor 40 providing a drive force for rotating the washing shaft 50.

Specifically, the motor 40 consists of a rotor 13 rotated in case of power impression and a stator 14 fixed within the rotor 13.

The top-loading drum type washer 10 consists of a damper absorbing vibration generated from the rotation of the drum 30, a base 80 connected to the other end of the damper 22 to support weight of the drum 30, and a drain 70 for draining the used water.

And, the top-loading drum type washer 10 consists of a drum position fixing device 90 enabling openings of the drum 30 and the tub 20 to coincide with each other all the time.

An operation of the above-configured top-loading drum type washer is explained as follows.

First of all, once power is applied to the drum type washer, the rotor 13 is rotated by a magnetic field appearing on the stator 14 of the motor to rotate the bushing 52 connected thereto. A serration formed on an inner circumference of the bushing 52 gears into a serration formed on an outer circumference of the washing shaft 50 to rotate the washing shaft 50.

As the washing shaft 50 rotates, the drum 30 is rotated to make a rotation of the laundry received therein. In doing so, the laundry is repeatedly lifted upward to fall.

After completion of washing, the drum position fixing device 90 plays a role in aligning an opening of the drum 30 to coincide with an opening of the tub 20.

Specifically, a locking protrusion of the drum position fixing device 90 comes into gearing with a locking recess of the rotor 13 to determine a stop position of the drum 30.

However, in case of the related art drum type washer that determines the position of the drum with the drum position fixing device, the rotor has kinetic energy amounting to its rotational speed. Hence, the rotor receives a considerable shock on gearing with the locking recess, thereby being damaged or broken.

SUMMARY OF THE INVENTION

Accordingly, the present invention is directed to a drum type washer that substantially obviates one or more of the problems due to limitations and disadvantages of the related art.

An object of the present invention, which has been devised to solve the foregoing problem, lies in providing a drum type washer, by which a drum opening can be correctly aligned with a tub opening without a physical contact with a drum or motor using a position detection sensor.

It is another object of the present invention to provide a drum type washer, by which a stator structure fitting a top-loading drum type washer is provided.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a drum type washer including a tub having a tub opening on an upper side and brackets on front and rear ends to support bearings, respectively, a drum provided within the tub to have a washing chamber inside, a door provided over the tub to open/close the tub opening, a motor rotating the drum, the motor including a rotor provided to an outside of the motor to make a rotation, the rotor including a rotor frame made of a steel plate in one body, a multitude of magnets attached to an inner circumference of the rotor frame, and a position decision magnet coupled to one side of the rotor frame and a stator provided within the rotor to receive a current, the stator including a sensing unit having a speed detection sensor detecting a plurality of the magnets and a position detection sensor detecting the position decision magnet, and a washing shaft coupled to a front center of the drum to be connected to the motor, and an assist shaft coupled to a rear center of the drum.

In another aspect of the present invention, there is provided a drum type washer including a tub having a tub opening on an upper side and brackets on front and rear ends to support bearings, respectively, a drum provided within the tub to have a washing chamber inside, a door provided over the tub to open/close the tub opening, a motor rotating the drum, the motor including a rotor provided to an outside of the motor to make a rotation, the rotor including a rotor frame made of a steel plate in one body, a multitude of magnets attached to an inner circumference of the rotor frame, and a position decision magnet coupled to one side of the rotor frame and a stator provided within the rotor to receive a current, the stator including a sensing unit having a speed detection sensor detecting a plurality of the magnets and a position detection sensor detecting the position decision magnet, a ring type stator core having a multi-layer structure configured in a manner of helically winding a steel plate consisting of a yoke portion and a coil portion from a lowest layer to a highest layer, an insulator formed by insertion injection to enclose an outside of the stator core, the insulator electrically insulating the stator core from outside, and a locking part built in one body of the insulator on an inner circumference of the stator core to fix the stator to a bearing housing, the locking part projected toward a center of the stator, and a washing shaft coupled to a front center of the drum to be connected to the motor, and an assist shaft coupled to a rear center of the drum.

In another aspect of the present invention, there is provided a drum type washer including a tub having a tub opening on an upper side and brackets on front and rear ends to support bearings, respectively, a drum provided within the tub to have a washing chamber inside, a door provided over the tub to open/close the tub opening, a motor rotating the drum, the motor including a rotor provided to an outside of the motor to make a rotation, the rotor including a rotor frame made of a steel plate in one body, a multitude of magnets attached to an inner circumference of the rotor frame, and a position decision magnet coupled to an outer circumference of a bushing coupled to a central part of the rotor frame and a stator provided within the rotor to receive a current, the stator comprising a sensing unit having a position detection sensor detecting the position decision magnet inside, and a washing shaft coupled to a front center of the drum to be connected to the motor, and an assist shaft coupled to a rear center of the drum.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT(S)

Reference will now be made in detail to the preferred embodiment(s) of the present invention, examples of which are illustrated in the accompanying drawings. Throughout the drawings, like elements are indicated using the same or similar reference designations where possible.

Figure 2:
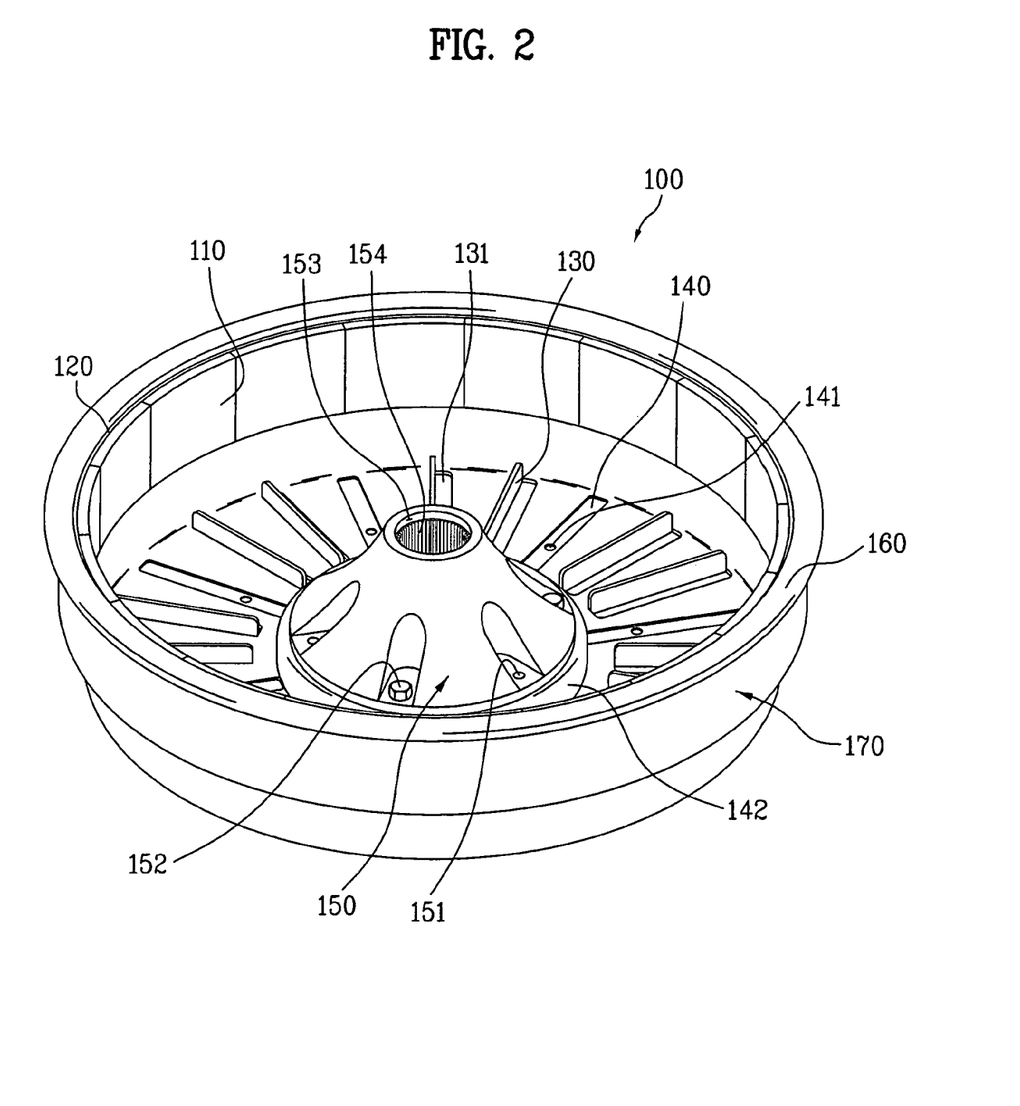
FIG. 2 is a perspective diagram of a rotor having a position detection sensor according to the present invention to configure a motor.

FIG. 2 is a perspective diagram of a rotor having a position detection sensor according to the present invention to configure a motor.

Referring to FIG. 2, a rotor 100 according to the present invention includes a steel-based rotor frame 170 configuring an overall shape, a multitude of magnets 110 attached to an inner circumference of a sidewall of the rotor 100, and a back yoke 120 provided between an inner circumference of the rotor 100 and a backside of each of the magnets 110 to form a magnetic path. Preferably, the overall shape of the rotor frame is formed by steel plate pressing.

Hence, it is able to omit the back yoke since the rotor frame 170 is made of a steel plate material, A bottom part of the rotor frame 170 includes a rising portion 142 projected from a central portion of the bottom part to a prescribed height and a bushing 150 mounted on the rising portion 142. The bushing 150 is provided with a perforated hole 153 so that a locking member (not shown in the drawing) such as a bolt and the like can be passed through the perforated hole 153 to couple the rotor to a washing shaft 50. And, a serration 154 is formed on an inner circumference of the perforated hole 153.

The bottom part of the rotor frame 170 includes a multitude of cooling fins 130 radially arranged between the bottom part and an edge of the rotor frame 170 and a multitude of embossed portions 140 provided between the cooling fins 130 to reinforce rigidity of the rotor 100.

Specifically, each of the cooling fins 130 is formed by cutting and bending of the bottom part of the rotor frame 170. Namely, each of the cooling fins 130 is formed by the cutting and bending carried out in a manner of cutting the bottom part of the rotor frame 170 into a 'ᒐ' shape, i.e., a one side open rectangle, and bending the open side of the rectangle at a prescribed angle.

And, an opening formed by the cutting and bending becomes a ventilating opening 131 in which air flows on rotating the rotor 100 to cool down heat generated from a stator 200. Moreover, a drain hole 141 is formed in each of the embossed portions 140.

Specifically, at least one or more locking members 152 are fitted into the bushing 150 of the rotor 100 centering around the perforated hole 153.

And, a position decision hole 151 is provided between the locking members 152 to align a corresponding hole into which the locking member 153 is fitted.

Moreover, a radially extending reinforcement rib 160 is formed on the sidewall of the rotor frame 170 to reinforce rigidity of the rotor 100.

Figure 3A:
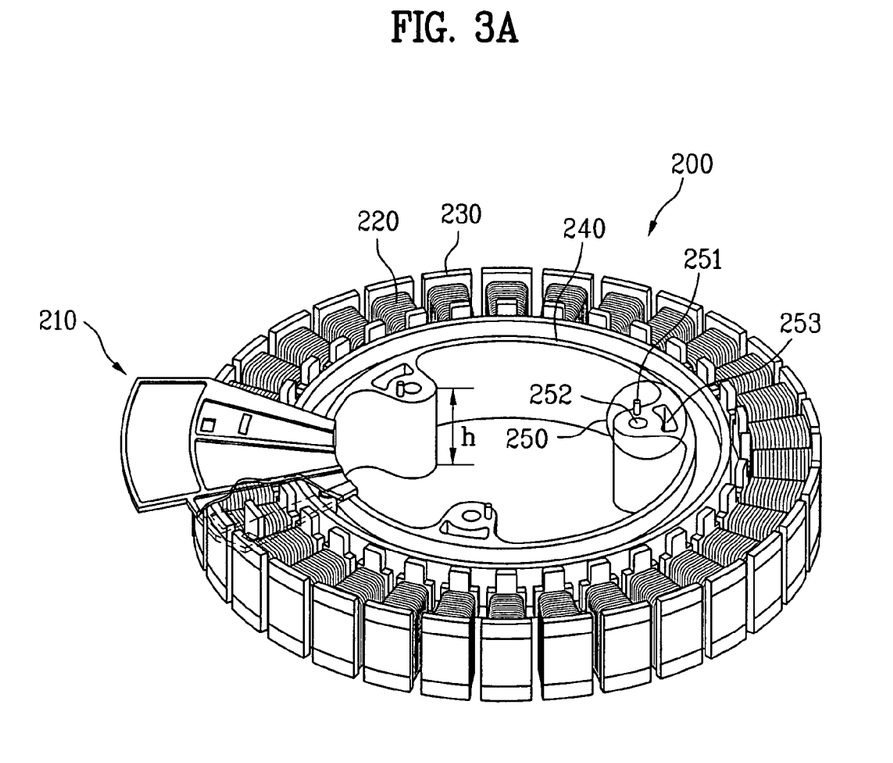
FIG. 3A is a perspective diagram of a stator having a position detection sensor attached thereto in a motor according to the present invention.
Figure 3B:
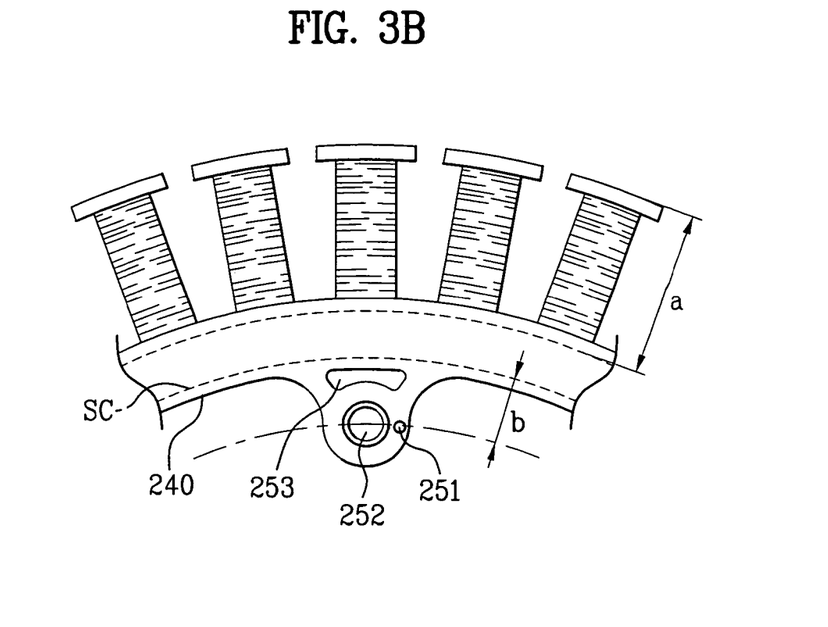
FIG. 3B is a magnified layout of the stator in FIG. 3A.
Figure 3C:
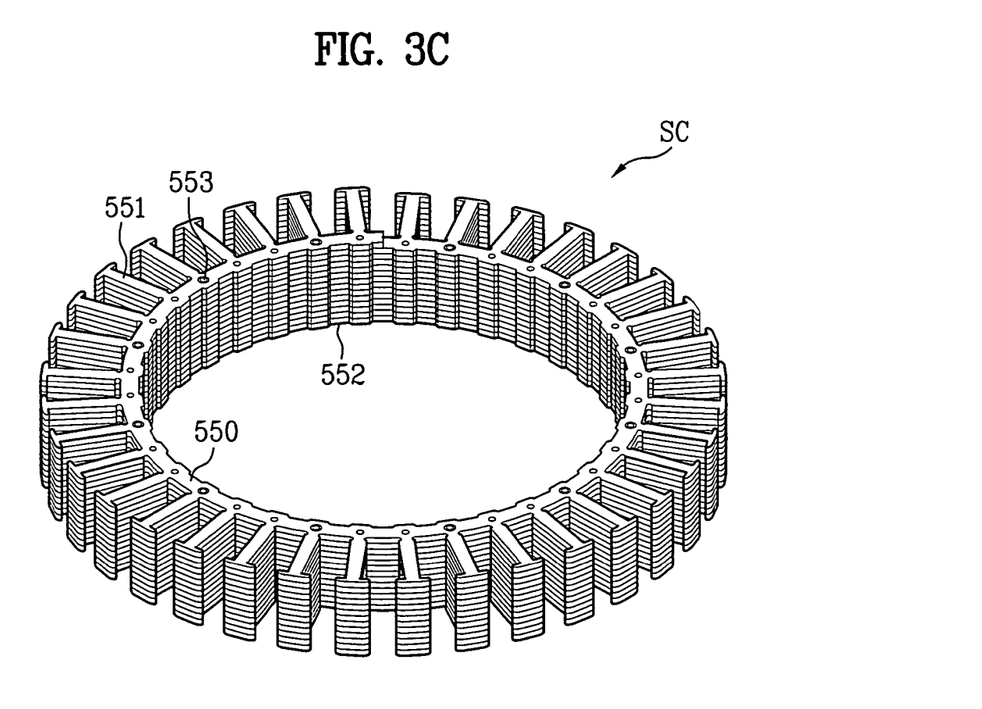
FIG. 3C is a perspective diagram of a stator core provided to a stator of the present invention.
Figure 4:
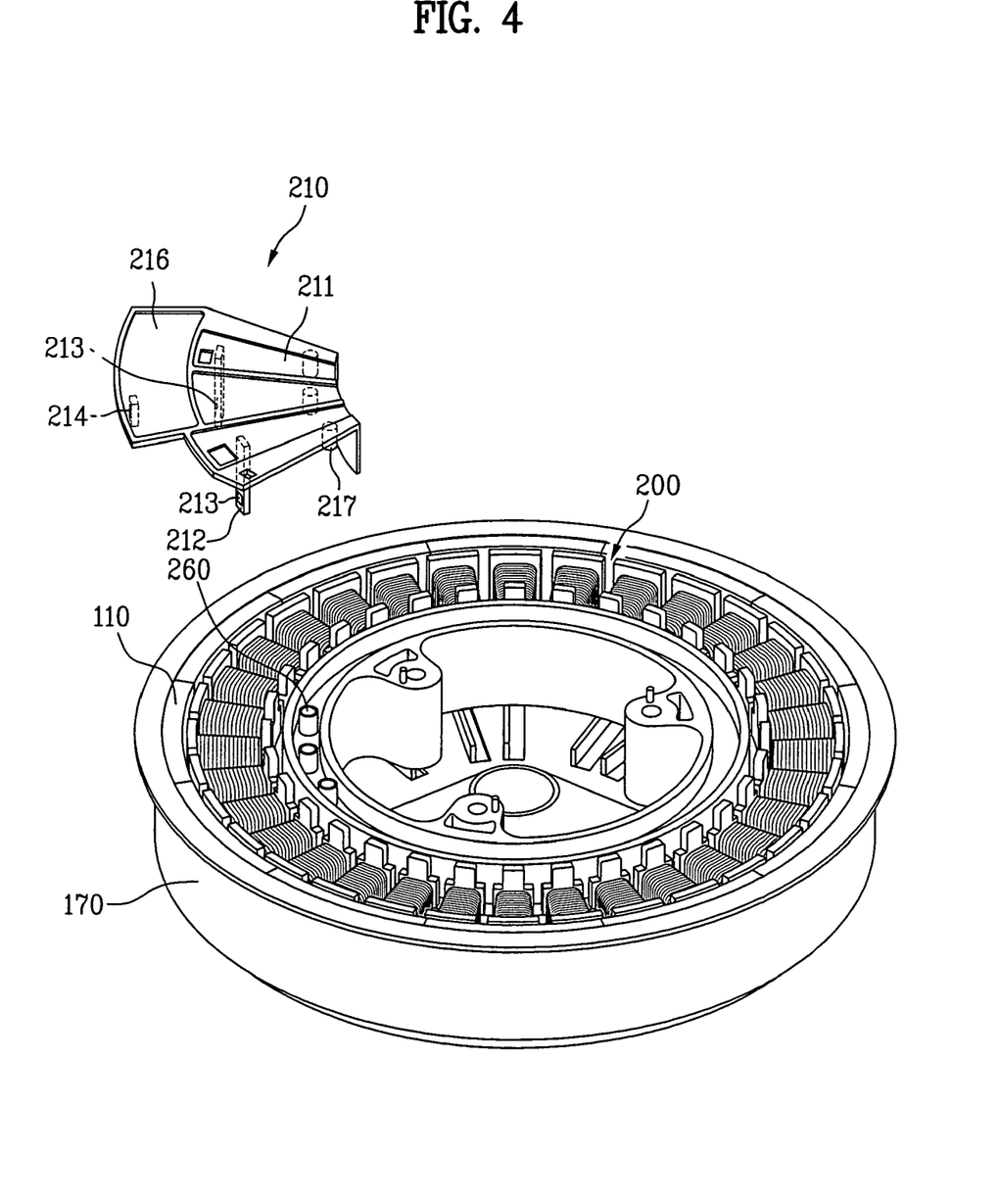
FIG. 4 is a projected perspective diagram of a stator and a position detection sensor according to the present invention.

FIG. 3A is a perspective diagram of a stator having a position detection sensor attached thereto in a motor according to the present invention, FIG. 3B is a magnified layout of the stator in FIG. 3A, FIG. 3C is a perspective diagram of a stator core provided to the stator of the present invention, and FIG. 4 is a projected perspective diagram of the stator and the position detection sensor according to the present invention, in which a process of assembling the position detection sensor to the stator is shown.

Referring to FIGS. 3A to 3C and FIG. 4, a stator 200 having a position detection sensor attached thereto according to the present invention includes a ring type stator core SC and an insulator 240 formed by insertion injection to enclose an outside of the stator core SC. The stator core SC has a multilayer structure configured in a manner of helically winding a steel plate consisting of a yoke portion 550 and a coil portion 551 from a lowest layer to a highest layer. And, the insulator 240 electrically insulates the stator core SC from outside.

Alternatively, the stator core SC can be differently configured in a manner of forming a multitude of stacks by stacking a multitude of arc type steel plates to a prescribed height and connecting a multitude of the stacks to form a perfect circle. And, each of the arc type steel plates includes a yoke portion and a coil portion.

The stator 200 includes a coil 220 multiply wound on the coil portion 551 after completion of insulating the coil portion 551 and at least one locking part 250 protruding in a central direction of the stator core from an inner circumference of the stator core to be built in one body of the insulator 240. And, the at least one protrusion 250 is provided for attaching the stator 200 to a tub support (not shown in the drawing).

Specifically, the locking part 250 includes a locking hole 252 for screw-locking the stator 200 to the tub support, a position decision protrusion 251 playing a role of alignment to have the locking hole 252 coincide with a locking hole (not shown in the drawing) of the tub support, and a space 253 provided behind the locking hole 252 to absorb vibration generated from driving the motor.

Alternatively, a position decision recess can be provided to the insulator 240 of the stator 200 and a position decision protrusion can be provided to the tub support.

Optionally, in the stator 200, a cylindrical metal (not shown in the drawing) for rigidity reinforcement of the locking part can be inserted inside the locking hole 252 provided to the center of the locking part 250.

Meanwhile, a height h of the locking part 250 is set to 20% of an overall height of the stacked core and is preferably set to 20~150% of the overall height of the stacked core.

Referring to FIG. 3B, assuming that a length of the coil portion 551 protruding from an outer circumference of the yoke portion of the stator core SC is 'a' and that a length from an inner circumference of the yoke portion of the stator core SC to a center of the locking hole 252 provided to the locking part 250 is 'b', the locking part is formed to meet a definition of 'a≧b'.

Referring to FIG. 3C, the stator core SC is riveted by rivets 553 penetrating holes provided to the yoke portion 550, respectively to sustain the stacked structure.

Moreover, a winding start point and a winding end point of the stator core SC are welded to contacting portions of the yoke portion 550, respectively.

Referring to FIG. 4, a Hall sensing unit 210 is loaded on an upper part of the stator 200. The Hall sensing unit 210 includes a Hall sensor housing 211, a Hall sensor loading part 212 provided to a bottom of the Hall sensor housing 211 to extend downward to a prescribed length, and a speed detection Hall sensor 213 attached to a tip of the Hall sensor loading part 212 to detect an electrode variation of the magnets 110 provided to the inner circumference of the rotor 100.

The Hall sensing unit 210 further includes a Hall sensor housing extension piece 216 extending from the Hall sensor housing 211 and a position detection Hall sensor 214 extending downward from a bottom of the extension piece 216 to a prescribed length.

A process of attaching the Hall sensing unit 210 to the stator 200 and an operation of the Hall sensor are explained as follows.

First of all, referring to FIG. 4, at least one fixing protrusion 217 provided to the bottom of the Hall sensor housing 211 is fitted into a fixing hole 260 provided to an upper part of the insulator to be concretely fixed thereto. Hence, the speed detection Hall sensor 213 lies to a predetermined depth between teeth 230 of the stator 200.

Meanwhile, once the rotor rotates, the speed detection Hall sensor 213 loaded in the Hall sensor loading part 212 detects the electrode variation of the magnets 110 provided to the inner wall circumference of the rotor to transfer a detection signal to a circuit board (not shown in the drawing) installed within the Hall sensor housing 211. The detection signal transferred to the circuit board is then transferred to a connector (not shown in the drawing).

Moreover, the position detection Hall sensor 214 detects a position decision magnet 300 provided to the rotor frame 170 to transfer a detection signal to the circuit board. The detection signal transferred to the circuit board is then transferred to the connector (not shown in the drawing).

FIGS. 5 to 11 show various embodiments of the configuration in assembling the position decision magnet 300 to the rotor.

First of all, limitation is not put on a loaded location of the position decision magnet 300 in a circumference direction of the rotor frame.

Instead, the rotor frame only needs to be assembled to a washing shaft so that a relative position of the position decision magnet 300 to a reference position of a drum opening can be uniformly sustained.

Once the position of the stator fixed to the tub is fixed, the position of the position detection Hall sensor 214 is fixed. And, the rotor frame and the drum are rotated at the same angle. Hence, it is able to control the motor so that the drum opening can be aligned with the door on detection of the position decision magnet 300.

For instance, in view of a rear side of the washer, if the position detection Hall sensor provided over the stator is loaded on the same line for a reference position of the door in a radial direction centering on the washing shaft and if the position decision magnet is attached to the rotor frame to lie on the same line for the reference position of the drum opening in the radial direction, the motor is controlled to stop the rotation of the drum the moment the position detection Hall sensor 214 detects the position decision magnet 300 or to rotate to stop the drum after at least one revolution of the drum.

To exactly stop the rotation of the drum on detection of the position decision magnet 300, it is a matter of course that a rotational speed of the drum should be sufficiently low. Otherwise, the drum need to be stopped after a rotational force of the drum is reduced by a constant number of revolutions.

Meanwhile, if the position detection Hall sensor 214 is provided to a location opposing the door, i.e., a location opposite to the reference position of the door, under the same condition (if the position decision magnet is attached to the rotor frame to lie on the same line for the reference position of the drum opening in the radial direction), the motor is controlled to stop the rotation of the drum after completion of alignment of the drum opening with the door in a manner of rotating the rotor by 180° after the position detection Hall sensor 214 has detected the position decision magnet 300.

Meanwhile, the position detection Hall sensor 214 can be manufactured to enable detection of the position decision magnet 300 above the position detection Hall sensor 214. And, it is also able to manufacture the position detection Hall sensor 214 to enable detection of the position decision magnet 300 in front of the position detection Hall sensor 214 like the detection of the speed detection Hall sensor 213 detecting the magnets provided to the inner circumference of the rotor frame 170. Moreover, the like embodiments lie within the scope of the present invention.

A following size, thickness, and shape of the position decision magnet 300 are not limited to those explained in the embodiments of the present invention unless they interrupt the rotation of the rotor or unless they cause damage to the rotor.

Figure 5:
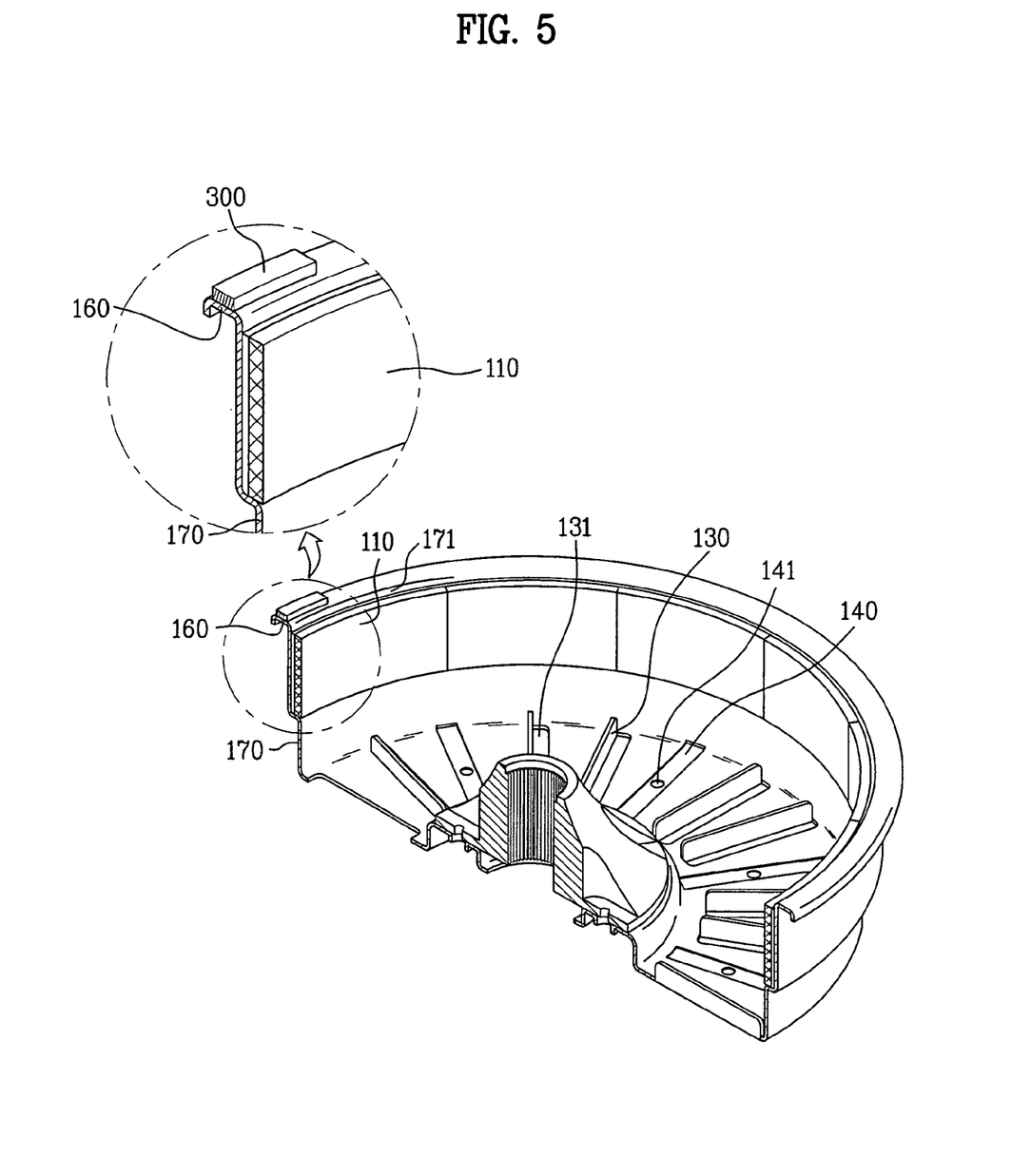
FIG. 5 is a perspective diagram of a position decision magnet according to the present invention bonded to a rotor frame.

FIG. 5 shows the simplest system that a position decision magnet according to the present invention is provided to an upper part of the rotor frame 170, in which a bond is used to attach the position decision magnet to a topside of the rigidity reinforcement rib 160 of the rotor frame 170.

Alternatively, the position decision magnet 300 can be attached to an upper inner circumference of the rotor frame 170 not to contact with the back yoke 120 and the magnets 110 using a bond.

Yet, in case of being attached to the rotor frame 170 via the bond, the position decision magnet 300 may be detached from the rotor frame 170 while the rotor is rotating at high rotational speed.

In order to overcome the expected incident, another embodiment of the present invention is explained as follows.

Figure 6:
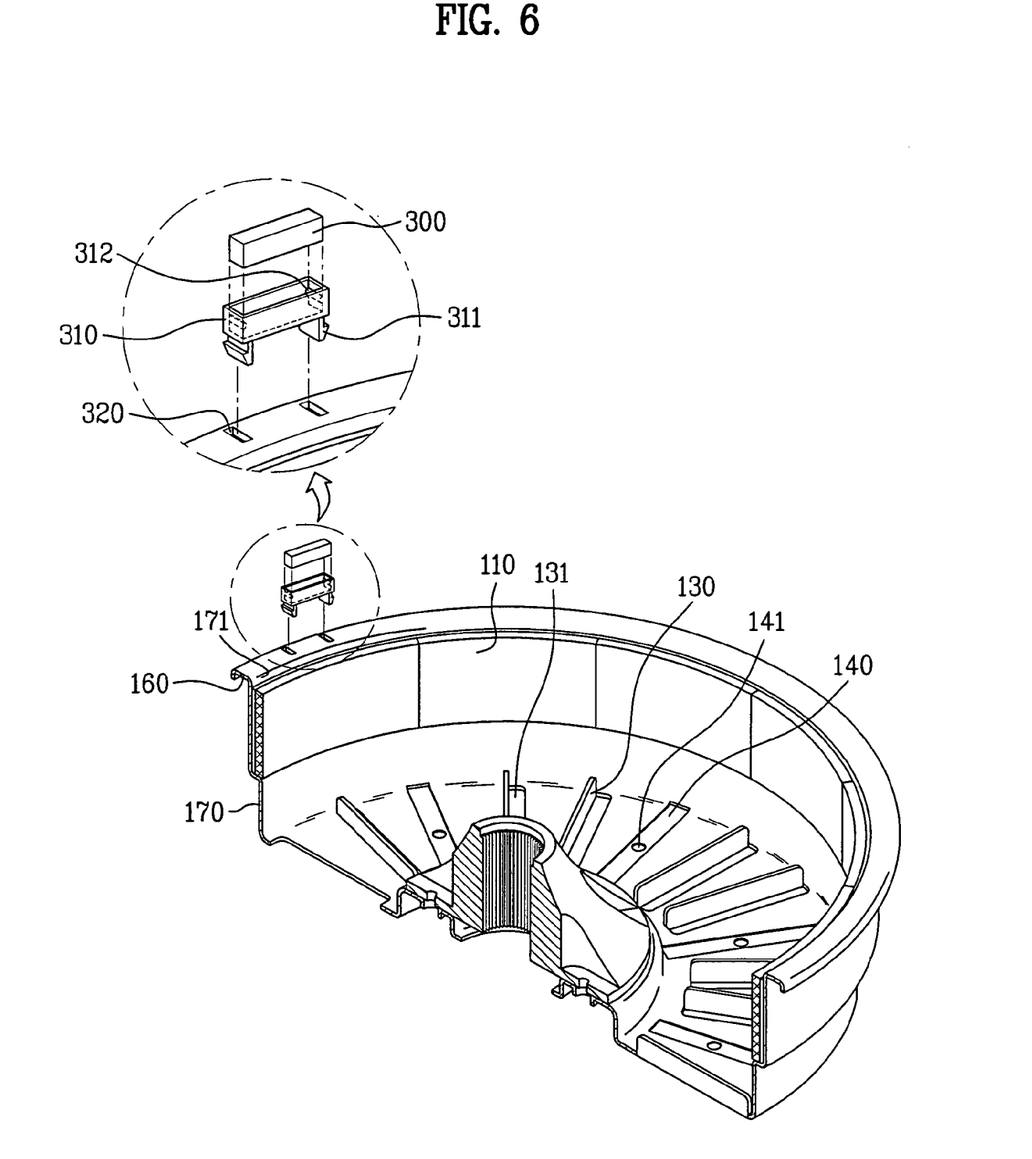
FIG. 6 is a projected perspective diagram of a position decision magnet according to the present invention inserted in a pocket to be attached to a rotor frame.

FIG. 6 is a projected perspective diagram of the position decision magnet according to the present invention inserted in a pocket to be attached to the rotor frame 170.

Referring to FIG. 6, the position decision magnet 300 is inserted in a pocket 310 receiving it instead of being attached to the rigidity reinforcement rib 160.

At least one hook 311 is provided to a bottom of the pocket 310 to be tightly fitted in at least one hook fitting hole 320 provided to the rigidity reinforcement rib 160.

Preferably, the pocket 310 and the at least one hook 311 are built in one body. At least one hanging protrusion 312 is provided to an inside of the pocket 310 to hold the position decision magnet 300 by snap-fitting.

In doing so, at least one counter-recess can be provided to corresponding sides of the position decision magnet 300. And, the at least one hanging protrusion 312 can be provided to any site of the inside of the pocket 310.

Moreover, a shape of the pocket 310 and a coupling means of the pocket 310 and the rotor frame 170 is not limited to the hooking system 311 and 320 of the embodiment of the present invention.

Figure 7:
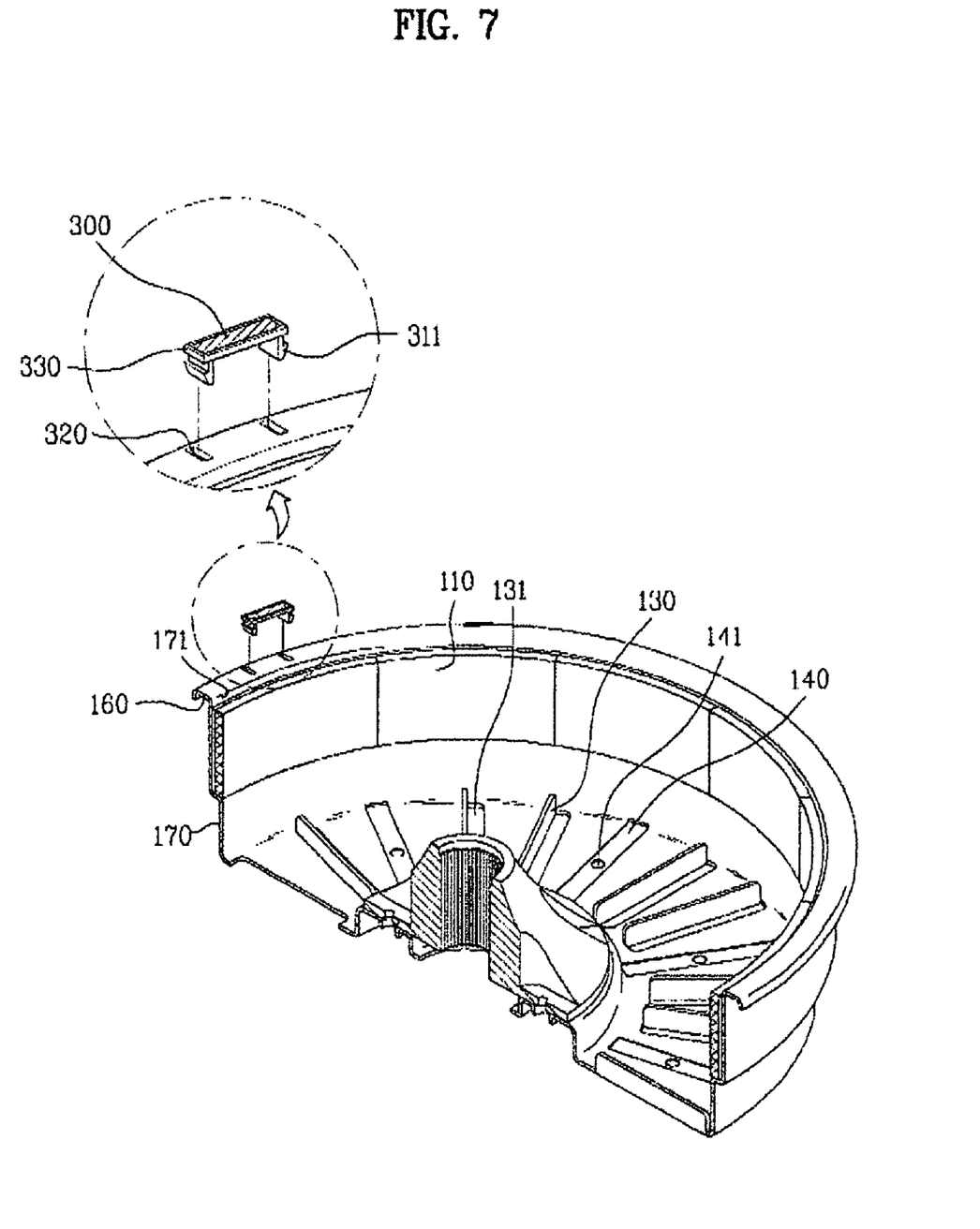
FIG. 7 is a projected perspective diagram of a position decision magnet according to the present invention built in one body of an injection pocket formed by injection molding to be assembled to a rotor.

FIG. 7 is a projected perspective diagram of the position decision magnet 300 according to the present invention built in one body of an injection pocket formed by injection molding to be assembled to the rotor.

Referring to FIG. 7, insertion injection is carried out on the position decision magnet 300 put in a mold having a shape of an injection pocket 330 to build the injection pocket 330 and the position decision magnet 300 in one body. Hence, the both of the injection pocket 330 and the position decision magnet 300 in one body are fitted into at least one insertion slot 320.

Figure 8:
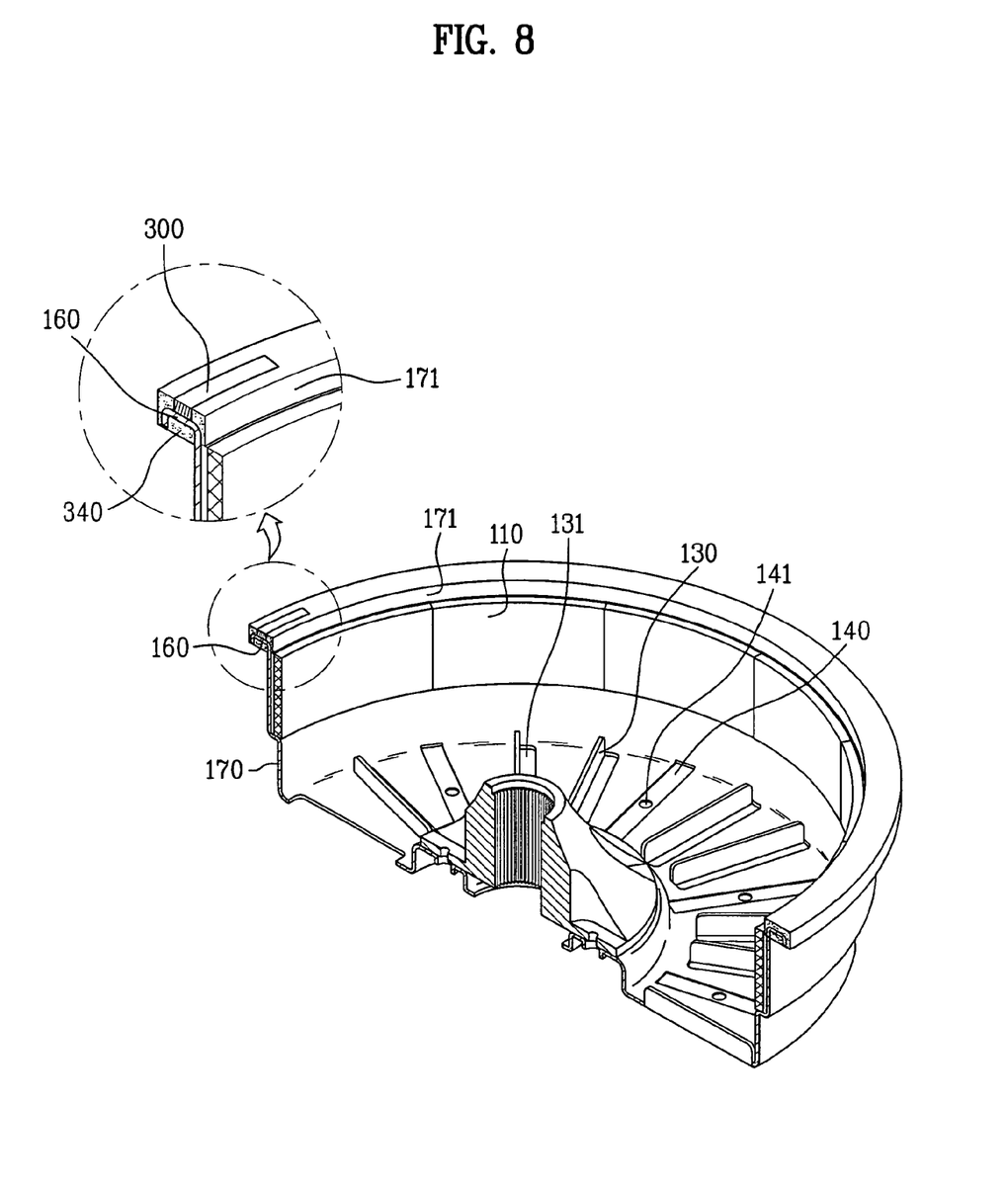
FIG. 8 is a perspective diagram of a position decision magnet according to the present invention buried in an injection belt to be assembled to a rotor.

FIG. 8 is a perspective diagram of a position decision magnet according to the present invention buried in an injection belt to be assembled to a rotor.

Referring to FIG. 8, the position decision magnet 300 is loaded on the rigidity reinforcement rib 160.

Subsequently, an injection belt 340 putting the position decision magnet 300 and the rigidity reinforcement rib 160 together is formed. Hence, a height of the rotor frame 170 is raised by a thickness of the position decision magnet 300.

Alternatively, the position decision magnet 300 is attached to an upper inner circumference 171 of the rotor frame not to contact with the back yoke 120 and the magnets 110. And, the insertion belt 340 is formed in the above same manner.

In doing so, in view of the drawing, it is apparent that the thickness of the position decision magnet 300 should not exceed the thickness of the back yoke 120 and the magnet 110.

Figure 9:
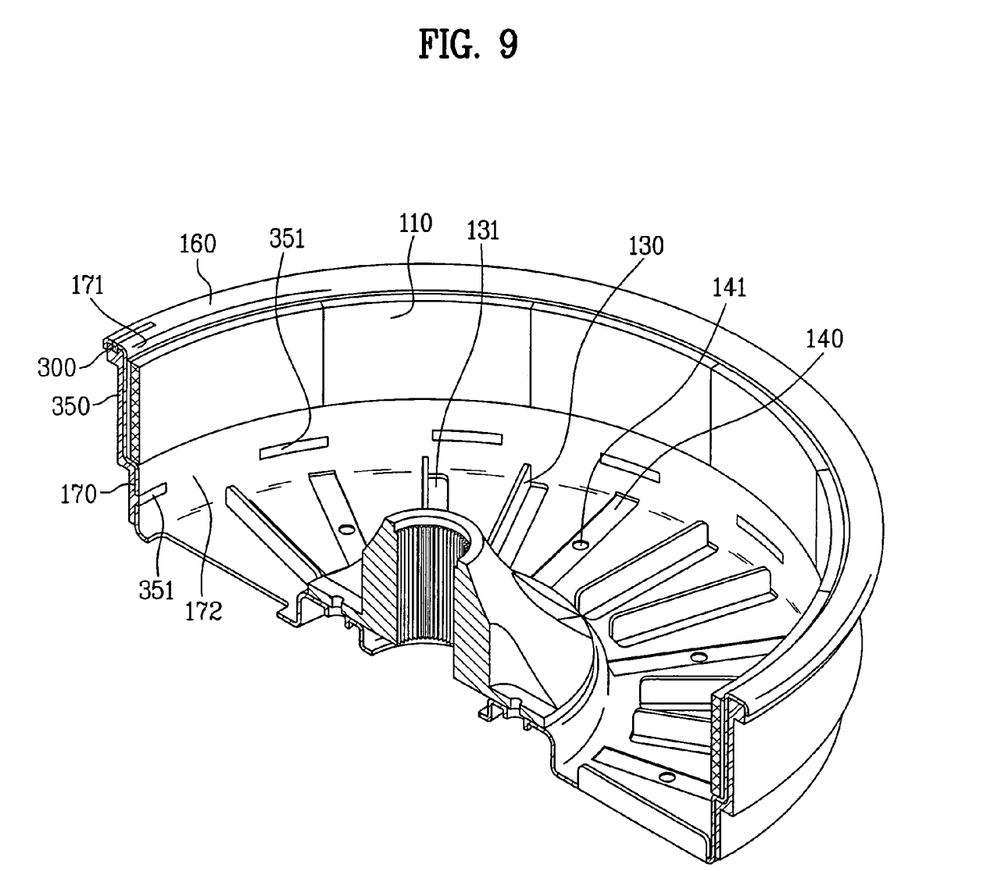
FIG. 9 is a perspective diagram of a position decision magnet according to the present invention fitted into a recess provided to a rigidity reinforcement rib, in which formation of an injection layer is shown.

FIG. 9 is a perspective diagram of a position decision magnet according to the present invention fitted into a recess provided to the rigidity reinforcement rib 160, in which formation of an injection layer 350 is shown.

Referring to FIG. 9, a recess having the same shape of the position decision magnet 300 is provided to the rigidity reinforcement rib 160. The position decision magnet 300 is then fitted in the recess.

Subsequently, an injection layer 350 is formed on a bottom surface of the rigidity reinforcement rib 160 and an outer circumference surface of the rotor frame 170.

Moreover, in order to prevent the injection layer 350 from being separated from the rotor frame 170, a plurality of injection slots 351 are formed through a lower circumference 172 of the rotor frame 170 so that an injection liquid can be injected in the injection slots 351. This is to raise coherence between the injection liquid and the rotor frame 170.

Alternatively, like the recess shown in FIG. 8, the recess for fitting the position decision magnet 300 therein can be provided to the upper inner circumference 171 not to contact with the back yoke 120 and the magnets 110, and the injection layer 350 is then formed in the above same manner.

Figure 10:
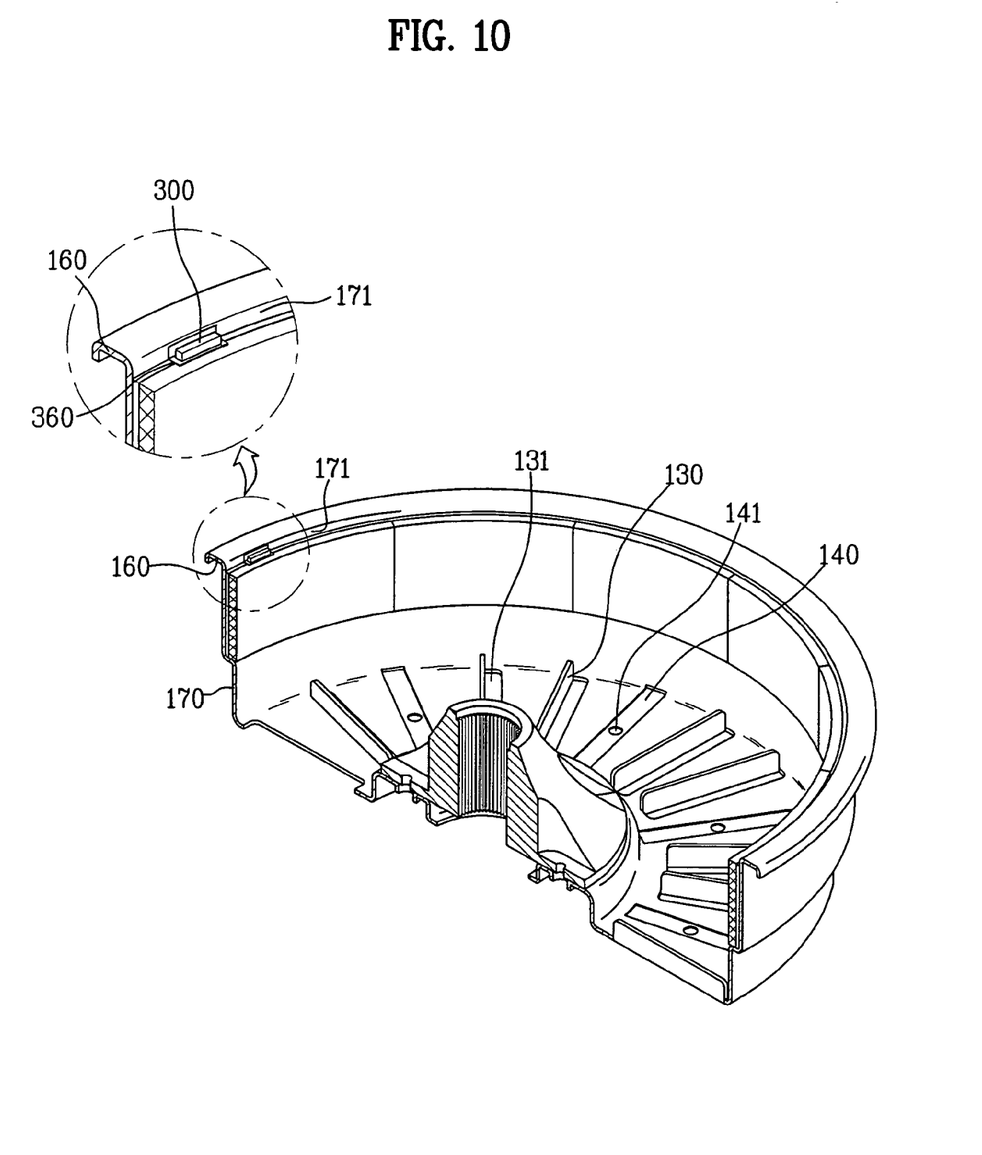
FIG. 10 is a perspective diagram of a position decision magnet according to the present invention loaded on an upper inner circumference of a rotor frame.

FIG. 10 is a perspective diagram of a position decision magnet according to the present invention loaded on the upper inner circumference of the rotor frame.

Referring to FIG. 10, a portion of an upper inner circumference of the rotor frame 170 is cut by cutting and bending and is then bent at 90° in a direction of a central axis of the rotor. Hence, the bent portion becomes a platform 360 of the position decision magnet 300.

Subsequently, the position decision magnet 300 is loaded on the platform 360. Optionally, the position decision magnet 300 can be attached to the platform 360 using a bond or adhesive agent.

Moreover, in view of the drawing, it is apparent that a width extending to the direction of the central axis of the rotor should be equal to or smaller than the total thickness of the back yoke 120 and the magnet 110. No limitation is put on a length of the platform 360 in a circumferential direction. Preferably, the circumferential length of the platform 360 is set equal to or greater than a length of the position decision magnet 300.

Figure 11:
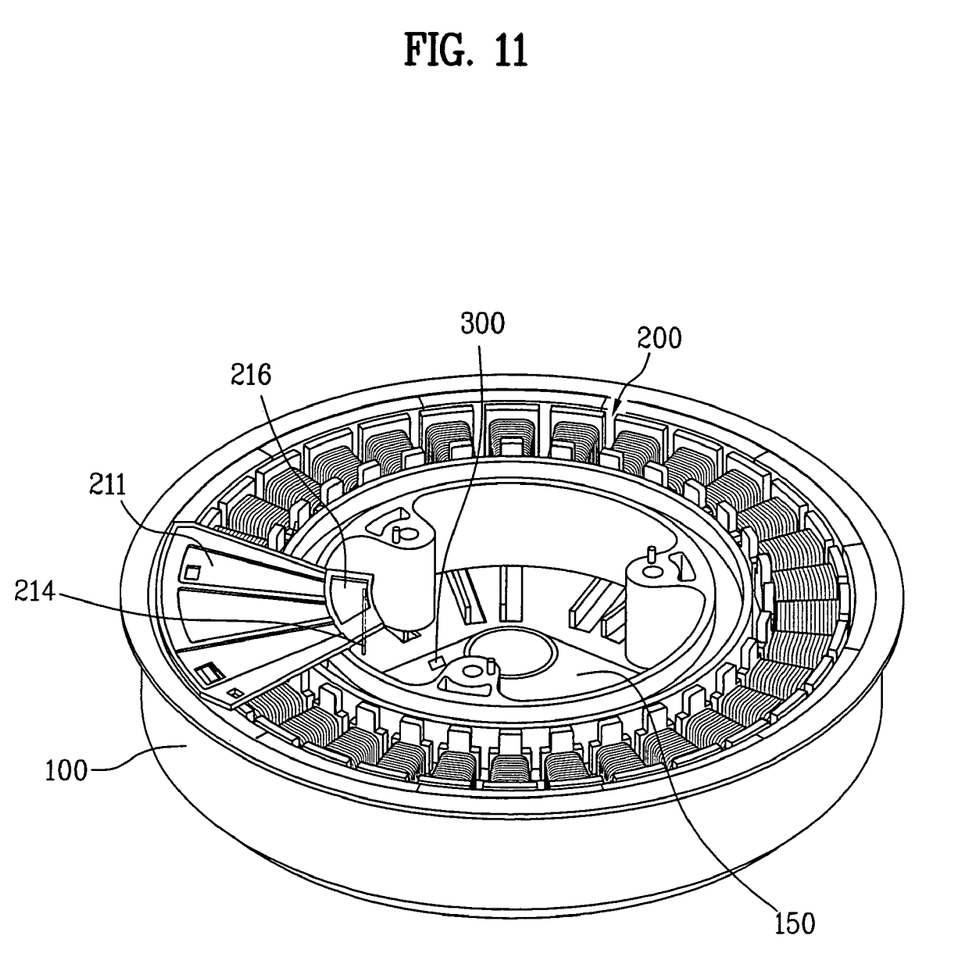
FIG. 11 is a perspective diagram of a position decision magnet according to the present invention loaded on an outer circumference of a bushing.

FIG. 11 is a perspective diagram of a position decision magnet according to the present invention loaded on an outer circumference of the bushing 150.

Referring to FIG. 11, in the description of the aforesaid embodiments of the present invention, the corresponding position decision magnet 300 is attached outside the stator.

On the contrary, the position decision magnet 300 of the present embodiment is attached inside the stator.

Since the position decision magnet 300 is attached to an outer circumference of the bushing 150 provided inside the stator, the position detection Hall sensor 214 needs to be placed inside the stator as well.

Hence, the Hall sensing unit 210 needs alteration of its shape. For instance, a location of the Hall sensor extension piece 216 extending from the Hall sensor housing 211 is changed to face a central axis of the stator 200.

Meanwhile, the bushing 150 is locked to the rotor frame 170 in one body via the locking member. Hence, on rotating the rotor frame 170, the bushing 150 is rotated together with the rotor frame 170 to provide the same effect.

Moreover, it is apparent to those skilled in the art that the position decision magnet 300 can be assembled to the bushing 150 by any one of the bonding assembly, the is pocket assembly, and the injection assembly.

Besides, weight balances are provided to prescribed sites to keep the balance of a high-speed rotation of the rotor. For instance, the weight balances are attached to opposite and both crossing sides in front of the position decision magnet 300, whereby the rotor frame 170 can be prevented from being distorted by the high-speed rotation of the rotor. If the rotor frame 170 is distorted, noise and vibration occurs on driving the motor.

Meanwhile, in the stator, as shown in FIG. 3C, configuring the motor together with the rotor 100, a multitude of grooves 552 are provided to the yoke portion 550 of the stator core SC to reduce stress in winding the core. Hence, the winding work can be done by a labor less than that of the related art.

Assuming that a length of the coil portion 551 protruding from an outer circumference of the yoke portion of the stator core SC is 'a' and that a length from an inner circumference of the yoke portion of the stator core SC to a center of the locking hole 252 provided to the locking part 250 is 'b', the locking part is formed to meet a definition of 'a≧b'. If the locking hole 252 is located closer to a weight-working point, it becomes more advantageous to have a small torque. Yet, if the locking hole 252 is too closer to the weight-working point, a diameter of the corresponding bolt gets smaller. Hence, too many bolts are needed to support the entire stator. This is taken into consideration by the present invention.

And, the height h of the locking part 250 is set to 20% of an overall height of the stacked core and is preferably set to 20~150% of the overall height of the stacked core. If the height h of the locking part 250 is set smaller than 20% of an overall height of the stacked core, it is probable that the locking part 250 may be broken by the vibration generated from driving the motor.

The greater the height of the locking part 250 becomes, the better the rigidity gets. Yet, if the height of the locking part 250 is excessively raised, an overall width of the washer driving unit increases to lower washing capability of the washer. By considering such a fact, the height of the locking part 250 is set not to exceed 150% of the height of the overall height of the stacked core.

The space 253 provided to the locking part 250 plays a role in buffering and attenuating the vibration generated from driving the motor to enhance mechanical reliability of the stator.

And, the position decision protrusion 251 provided to the locking part 250 gears into the position decision recess of the tub or tub support, thereby facilitating the locking of the stator.

Accordingly, the present invention provides the following effects or advantages.

First of all, the drum opening, tub opening, door of the top-loading drum type washer having the door provided to its topside are aligned on the same straight line without physical contact with each other in case of completion of washing.

Secondly, the present invention reduces materials and weight of the stator of a BLDC motor for the top-loading drum type washer, simplifies a manufacturing process of the BLDC motor, and loads the BLDC motor on a fixing side such as a bearing housing and a tub.

Specifically, the present invention provides the structure enabling the tub side to tolerate the weight and vibration of the BLDC motor in directly attaching the BLDC motor to the bearing housing or a sidewall of the tub of the top-loading drum type washer that includes the stator weighing over 1.5 kg to control the rotation of the drum by varying the rotational speed from 0~2,000 RPM or higher.

Thirdly, the present invention facilitates the stator to be assembled to the bearing housing or tub side in an assembly line, thereby enabling convenient maintenance and repair work in providing after-service.

Finally, the present invention employs the stator core having the facilitating structure of the winding work, thereby preventing waste of the basic material, facilitating the manufacturing process, and enhancing mechanical reliability and endurance by raising the rigidity of the locking part of the stator to reduce the noise and vibration.

It will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. A drum type washer comprising:
   a tub having a tub opening and brackets on the tub to support bearings;
   a drum provided within the tub to have a washing chamber inside;
   a door provided over the tub to open/close the tub opening;
   a motor rotating the drum, the motor comprising;
   a rotor provided to an outside of the motor to make a rotation, the rotor comprising:
   a rotor frame made of a steel plate in one body;

a multitude of magnets attached to an inner circumference of the rotor frame; and
a position decision magnet coupled to one side of the rotor frame;
a stator provided within the rotor to receive a current, the stator comprising:
a sensing unit having a speed detection sensor detecting a plurality of the magnets and a position detection sensor detecting the position decision magnet;
a washing shaft coupled to a front center of the drum to be connected to the motor; and an assist shaft coupled to a rear center of the drum; and
wherein the sensing unit comprising:
a sensor housing mounted to an insulator of the stator;
a sensor loading part provided at the sensor housing wherein a speed detector sensor extends into a gap between an inner stator teeth and the insulator;
wherein the speed detection sensor detects an electrode variation of the magnets provided to the inner circumference of the rotor;
a sensor housing extension piece extending from the sensor housing; and
the position detection sensor extending into a gap between an inner circumference of the rotor and an outer circumference of the stator.

2. The drum type washer of claim 1, wherein a weight balance is attached to a site opposite to a place having the position decision magnet attached thereto.

3. The drum type washer of claim 1, wherein weight balances are attached to opposite and/or both crossing sites in front of the position decision magnet.

4. The drum type washer of claim 1, wherein the position decision magnet is attached to an upper side of a rigidity reinforcement rib of the rotor frame using an adhesive agent.

5. The drum type washer of claim 1, wherein the position decision magnet is inserted in a pocket having a hanging protrusion on an inner circumference and a hook on a lower outer circumference so that the hook is fined into a recess provided to an upper side of a rigidity reinforcement rib of the rotor frame.

6. The drum type washer of claim 1, wherein the position decision magnet is built in one body of an injection pocket formed by injection molding to be attached to an upper side of a rigidity reinforcement rib of the rotor frame by hook coupling.

7. The drum type washer of claim 1, wherein the position decision magnet attached to an upper side or an upper inner circumference of a rigidity reinforcement rib of the rotor frame is buried in an injection belt provided along the rigidity reinforcement rib to be assembled to the rotor.

8. The drum type washer of claim 1, wherein the position decision magnet inserted in a slot perforating an upper side or an upper inner circumference of a rigidity reinforcement rib of the rotor frame is buried in an injection layer formed along an outer circumference of the rotor frame to be assembled to the rotor.

9. The drum type washer of claim 1, wherein the position decision magnet is loaded on a platform formed by cutting and bending a portion of an upper inner circumference of a rigidity reinforcement rib of the rotor frame.

10. The drum type washer of claim 1, the stator comprising
a ring type stator core having a multi-layer structure configured in a manner of helically winding a steel plate consisting of a yoke portion and a coil portion from a lowest layer to a highest layer;
an insulator formed by insertion injection to enclose an outside of the stator core, the insulator electrically insulating the stator core from outside; and
a locking part built in one body of the insulator on an inner circumference of the stator core to fix the stator to a bearing housing, the locking part projected toward a center of the stator,
wherein a locking hole is provided to a center of the locking part to fix the stator to the bearing housing using a screw.

11. The drum type washer of claim 10, the stator further comprising a cylindrical metal inserted inside the locking hole.

12. The drum type washer of claim 10, wherein a height of the locking part corresponds to 20-150% of an overall height of the stacked core.

13. The drum type washer of claim 10, wherein assuming that a length of the coil portion protruding from an outer circumference of the yoke portion of the stator core is 'a' and that a length from an inner circumference of the yoke portion of the stator core to a center of the locking hole provided to the locking part is 'b', the locking part is formed to meet a definition of '$a \geqq b$'.

14. The drum type washer of claim 10, wherein a space is provided to the locking part to buffer vibration generated from driving the motor.

15. The drum type washer of claim. 10, wherein the stator core is assembled by a rivet passed through a perforated hole provided to the yoke portion.

16. The drum type washer of claim 10, wherein a winding start point and a winding end point of the stator core are welded to contacting portions of the yoke portion, respectively.

17. The drum type washer of claim 10, wherein a position decision protrusion is further provided to the insulator of the stator.

18. The drum type washer of claim 10, wherein a bottom part of the rotor frame comprises a multitude of cooling fins radially arranged between the bottom part and an edge of the rotor frame and a multitude of embossed portions provided between the cooling fins.

19. The drum type washer of claim 1, wherein the stator further comprises:
a ring type stator core having a multi-layer structure configured in a manner of helically winding a steel plate consisting of a yoke portion and a coil portion from a lowest layer to a highest layer;
an insulator formed by insertion injection to enclose an outside of the stator core, the insulator electrically insulating stator core from outside; and
a locking part built in one body of the insulator on an inner circumference of the stator core to fix the stator to a bearing housing, the locking part projected toward a center of the stator.

* * * * *